June 17, 1958   E. O. SCHNEIDERSMANN   2,839,594
CONTACT THERMOCOUPLE ASSEMBLY
Filed June 24, 1955
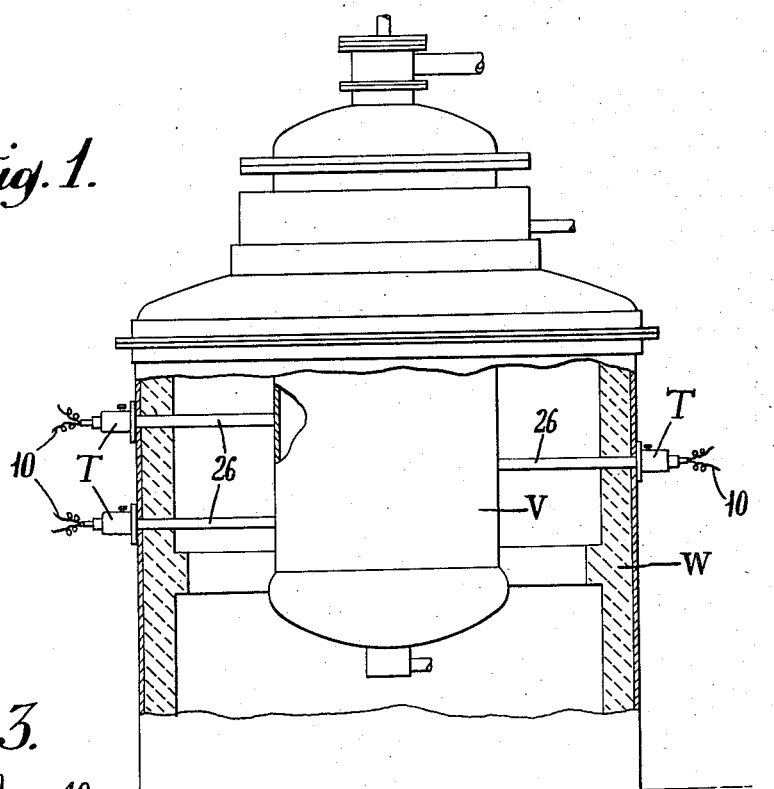
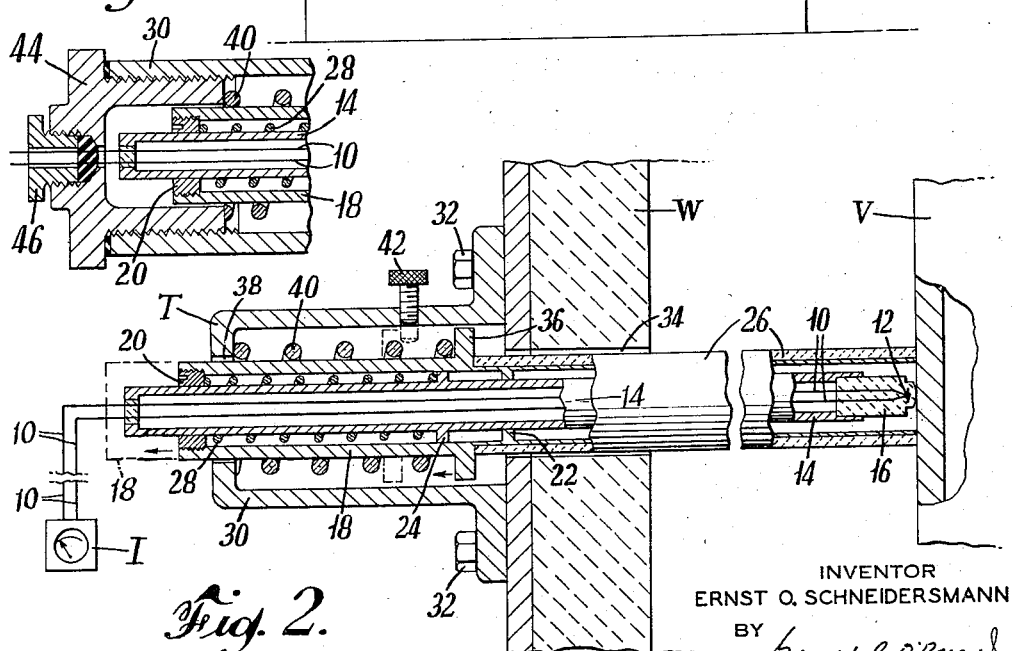
INVENTOR
ERNST O. SCHNEIDERSMANN
BY
ATTORNEY

2,839,594

CONTACT THERMOCOUPLE ASSEMBLY

Ernst O. Schneidersmann, Niagara Falls, N. Y., assignor to Union Carbide Corporation, a corporation of New York Application June 24, 1955, Serial No. 517,791

7 Claims. (Cl. 136—4)

The present invention relates to a thermocouple assembly of the contact type for measuring the surface temperature of a hot body in a heating furnace.

In many metallurgical processes, various metals are heated within a reaction vessel by hot gases from combustion of gaseous or liquid fuels generated within a furnace. The reaction temperature of the metals must be properly regulated if the reaction is to be safely controlled. One method of determining such reaction temperatures is by measuring the surface temperatures of the reaction vessel. When such a procedure is followed, the surface temperatures may be readily employed as a means of indirectly determining the reaction temperatures of the metals being heated. In measuring the surface temperatures of the reaction vessel, a thermocouple assembly of the contact type has generally been employed.

Heretofore, when the thermocouples of the contact type have been inserted within a furnace for measuring surface temperatures of a hot body, they were constantly subjected to the effects of hot combustion gases and eventually corroded. This problem was especially evident when hydrocarbon gases were employed to supply heat within the furnace. Furthermore, a contact thermocouple, when exposed to hot combustion gases, is effected by carburization of the thermocouple elements and recalibration of the instrument under such condittions is frequently required. In addition, the hot combustion gases which surround the thermocouple elements were invariably much hotter than the surface being measured and erroneous temperature readings were recorded.

Such thermocouples, when in contact with the surface of a reaction vessel, were found to be influenced by the effects of variable pressures induced on the thermocouple junction due to thermal expansion of the vessel walls. Further, when it was found necessary to shift the position of the reaction vessel, or in any way disturb the junction between the hot surface and the thermocouple elements, constant mechanical adjustments in the thermocouple assembly were required to maintain the proper positioning of the thermocouple. Whenever the reaction products are allowed to solidify in the reaction vessel, it is often necessary to remove the vessel completely from the furnace. During this procedure, the thermocouples heretofore employed required complete removal from the furnace walls.

Accordingly, the primary object of this invention is to provide an improved thermocouple assembly of the contact type having high resistance to combustion gases as well as resistance to the influence of such gases in measuring the surface temperatures of a hot body in a heating furnace.

A further object of this invention is to provide a thermocouple of the contact type having a junction which is unaffected by the thermal expansion of the object being measured.

A still further object is to provide a thermocouple which is retractable from the surface of the hot body when not in use and which may be so retracted with comparative ease.

Other aims and advantages will be apparent from the following description and appended claims.

In accordance with the present invention, a thermocouple assembly is provided which protects the thermocouple elements from the carburizing combustion gases surrounding the hot body being measured. The entire assembly is mounted within a housing and is spring-loaded to maintain a uniform constant pressure between the thermocouple junction and the surface of the hot body. In order to fully describe the apparatus of the invention, reference is made to the figures of the accompanying drawing which schematically shows apparatus embodying the invention, and wherein:

Fig. 1 is an elevational view, partially in section, illustrating the arrangement of the furnace, the reaction vessel, and the thermocouple assembly of the invention;

Fig. 2 is a sectional view of a thermocouple assembly of the contact type embodying the invention; and Fig. 3 is a sectional view of a modification to the thermocouple assembly of the invention.

Referring specifically to the drawing, a thermocouple assembly T is mounted in a furnace wall W and in contact with the surface of a reaction vessel V. Thermocouple wires 10 are provided which are welded together to form the thermocouple junction 12. The thermocouple wires 10 are supported within tubular supporting member 14 and insulated therefrom by refractory bushing 16 fitted into an end of the tubular supporting member 14. The refractory bushing 16 extends beyond the end of the tubular supporting member 14 so that its surface is capable of thermally contacting the reaction vessel V. The thermocouple junction 12 is positioned on the surface of the refractory bushing 16, whereby thermal contact between the junction and the surface of the reaction vessel V is effected. If this contact exposes the thermocouple junction 12 to an alloying or corroding medium, the junction may be clad or, in some similar manner, capped with a layer of inert metal; but it is preferred that the thermal sensitivity of the junction be maintained at a minimum level. A temperature- or millivolt-indicating instrument I calculated to read temperature is provided and is energized by the thermocouple circuit. The tubular supporting member 14 is preferably constructed of a heat- and corrosion-resistant material, for example stainless steel, to insulate the thermocouple wires 10 from the thermal and corrosive effects of the surrounding gases.

A protective tube 18 is provided for insulating the tubular supporting member 14 and the thermocouple elements from the effects of radiation and convection of the surrounding gases. A bushing 20 in the rear of protective tube 18 is also provided for concentrically and slidably mounting tubular supporting member 14 within the protective tube 18. Associated with the protective tube 18 and the tubular supporting member 14, respectively, are abutting collars 22 and 24 for limiting the passage of the tube 14 through protective tube 18. The protective tube 18 is composed of a heat- and corrosion-resistant material as for example stainless steel. To prevent the effects of heat and corrosion, the protective tube 18 is also provided with a refractory coating 26, preferably composed of a porcelain material.

Helical spring means 28 is further provided between the tubular supporting member 14 and the protective tube 18 for maintaining thermocouple junction 12 in constant thermal contact with the surface of the reaction vessel V. By employing a spring assembly as shown in the drawing, it is possible to compensate for any variation in the pressure on the thermocouple junction 12 due to thermal expansion of the reaction vessel V and a uniform even pressure will be maintained between the thermocouple junction 12 and the surface of the body being measured.

Housing 30, attached to the furnace wall W by stud means 32, is also provided for normally guiding the tubes 14 and 18 through opening 34 in the furnace wall W and against the surface of the reaction vessel V. An abutting collar 36, projecting from protective tube 18, provides a means for limiting the passage of tube 18 through the housing 30. Housing 30 is further provided at its closed end with opening 38, in alignment with opening 34 in furnace wall W, which affords a means for the horizontal passage of the tubes 14 and 18 through housing 30. Pressure means 40 (helical spring) is also provided between housing 30 and protective tube 18 for normally maintaining the tube 18 against the surface of the reaction vessel V. By employing such a spring assembly, the helical spring pressure means 40 is utilized to provide a gas-tight seal between the protective tube 18 and the surface of the reaction vessel V. This gas-tight seal provides an enclosure surrounding thermocouple junction 12 and permits mounting junction 12 in thermal contact with the surface of the reaction vessel V in a non-corrosive atmosphere. In addition, by providing such a gas-tight seal, tubular supporting member 14 is insulated from the heat and corrosive effects of the surrounding gases.

In the event that the hot body is removed from within the furnace walls W or, as in common metallurgical practice, the reaction vessel is removed from the furnace for further processing of the reaction products, the entire thermocouple assembly may be retracted and retained in an off-contact position by set screw means 42 positioned to pass radially through the housing 30. When it is desired to retain the assembly free from the surface of the reaction vessel V, set screw means 42 is adjusted to be positioned in front of abutting collar 36, thereby holding the assembly in the retracted position.

The ease with which the thermocouple assembly can be maintained in the retracted position permits as many thermocouples as are deemed necessary to be mounted on the furnace wall W. Accordingly, several points of thermal contact can be maintained and any uneven distribution of heat within the reaction vessel V is thereby rapidly detected.

The thermocouple assembly of the present invention may be adapted to be utilized in conjunction with a vacuum-type heating chamber or with other heating systems which require the assembly to be gas-tightly sealed to the interior of the heating furnace. A modification of thermocouple assembly suitable for use with such furnaces is shown in Fig. 3 of the drawing. As there shown, the housing 30 extends over inner tube 14 and outer tube 18 to form a vacuum seal. A packing gland 44 is provided in housing 30 and gas-tightly seals the housing from the atmosphere surrounding the heating furnace. Thermocouple wires 10 are led into the inner tube 14 through cap 46 provided in packing gland 44. By employing the modification of the present invention, the housing 30 is gas-tightly sealed to the interior of the heating furnace and the thermocouple junction protected from the influence of the medium heating the hot body within the furnace.

It has been found that when the surface of the reaction vessel V consists of a metal which forms a scale when heated, an erroneous indicated temperature will be obtained. This effect can be eliminated by cladding the contact area with a thin layer of a non-corrosive metal of high thermal conductivity.

In an example of the apparatus embodying the present invention, a thermocouple concentrically positioned in a spring-loaded inner tube of stainless steel which was, in turn, positioned in a concentric outer tube of stainless steel having an outer coating of porcelain was inserted through a furnace wall and brought into contact with a hot reaction vessel wall. The apparatus proved successful with little variation in the indicated temperature and proved to afford high resistance to attack by surrounding corrosive gases.

What is claimed is:

1. A thermocouple assembly adapted to be inserted through an opening in a furnace wall for measuring the surface temperature of a hot body in an atmosphere of hot combustion products comprising, in combination a housing adapted to be mounted on the exterior of said furnace wall having a passage therethrough in alignment with said opening; an outer elongated tube reciprocally mounted within and extending through said passage and said opening, whereby an end of said tube passes into said furnace to contact the surface of said hot body therein; an inner elongated tube concentrically positioned and slidably mounted within said outer tube and having a refractory bushing positioned in one end thereof, said refractory bushing containing a thermocouple junction for thermally engaging the surface of said hot body; electrical circuit means passing from said thermocouple junction and through said inner tube to a temperature indicating means remotely positioned from said furnace; and two concentric pressure means for maintaining said bushing and outer tube in substantially uniform pressure contact with said hot body.

2. A thermocouple assembly in accordance with claim 1, wherein the inner one of said pressure means comprises helical spring means disposed between said outer elongated tube and said inner elongated tube, whereby said inner tube is urged forwardly into said furnace and whereby said bushing is urged under substantially uniform pressure against the surface of said hot body.

3. A thermocouple assembly in accordance with claim 1, wherein the outer of said pressure means is provided between said housing and said outer elongated tube, whereby said outer tube is urged forwardly into said furnace and against the surface of said hot body under a substantially uniform pressure to protect said thermocouple junction from said atmosphere of hot combustion products.

4. A thermocouple assembly adapted to be inserted through an opening in a furnace wall for measuring the surface temperature of a hot body in an atmosphere of hot combustion products comprising, in combination, a housing adapted to be mounted on the exterior of said furnace wall having a passage therethrough in alignment with said opening; an outer elongated tube reciprocally mounted within and extending through said passage and said opening, whereby an end of said tube passes into said furnace to contact the surface of said hot body therein; an inner elongated tube concentrically positioned and slidably mounted within said outer tube and having a refractory bushing positioned in one end thereof, said refractory bushing containing a thermocouple junction for thermally engaging the surface of said hot body; electrical circuit means passing from said thermocouple junction and through said inner tube to a temperature indicating means remotely positioned from said furnace; helical spring means disposed between said outer elongated tube and said inner elongated tube, whereby said inner tube is urged forwardly into said furnace and whereby said bushing is urged under substantially uniform pressure against the surface of said hot body; and pressure means provided between said housing and said outer elongated tube, whereby said outer tube is urged forwardly into said furnace and against the surface of said hot body under a substantially uniform pressure to protect said thermocouple junction from said atmosphere of hot combustion products.

5. A thermocouple assembly in accordance with claim 4, wherein said outer elongated tube comprises a heat- and corrosion-resistant material provided with an outer coating of a refractory material, whereby said outer tube is protected from the heat and corrosion effects of said atmosphere of hot combustion products.

6. A thermocouple assembly in accordance with claim 4, wherein said housing is provided with retaining means, whereby said inner and said outer tubes are held in a retracted position for removal of said hot body from said furnace.

7. A thermocouple assembly in accordance with claim 4, wherein said housing is provided with a packing gland for sealing said housing gas-tightly to the interior of said furnace.

References Cited in the file of this patent

UNITED STATES PATENTS

| | | |
|---|---|---|
| 2,194,489 | Woodson | Mar. 26, 1940 |
| 2,223,408 | Dietert | Dec. 3, 1940 |
| 2,374,377 | Percy | Apr. 24, 1945 |
| 2,476,099 | Knudsen | July 12, 1949 |
| 2,516,952 | Bristol | Aug. 1, 1950 |

OTHER REFERENCES

Circular 80 of Sowers Mfg. Co., 1937, page 4.